(12) United States Patent
Omura et al.

(10) Patent No.: US 9,666,333 B2
(45) Date of Patent: May 30, 2017

(54) SHIELDED ELECTRIC WIRE AND WIRE HARNESS USING THE SAME

(71) Applicant: YAZAKI CORPORATION, Tokyo (JP)

(72) Inventors: Takeyuki Omura, Susono (JP); Hidenobu Oka, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 15/097,479

(22) Filed: Apr. 13, 2016

(65) Prior Publication Data

US 2016/0336094 A1 Nov. 17, 2016

(30) Foreign Application Priority Data

May 15, 2015 (JP) .................................. 2015-099685

(51) Int. Cl.
  *H01B 7/18* (2006.01)
  *H01B 7/00* (2006.01)

(52) U.S. Cl.
  CPC ......... *H01B 7/1855* (2013.01); *H01B 7/0045* (2013.01)

(58) Field of Classification Search
  CPC .......................... H01B 7/1855; H01B 7/0045
  USPC ........................................... 174/72 A, 102 R
  See application file for complete search history.

(56) References Cited

U.S. PATENT DOCUMENTS

| | | | |
|---|---|---|---|
| 5,278,356 A | 1/1994 | Miller | |
| 2002/0020545 A1* | 2/2002 | Suzuki | ................. H01B 7/0861 174/117 F |
| 2010/0122831 A1* | 5/2010 | Watanabe | .............. H01B 7/426 174/107 |
| 2011/0247856 A1 | 10/2011 | Matsuda et al. | |

(Continued)

FOREIGN PATENT DOCUMENTS

| | | |
|---|---|---|
| CN | 103282973 A | 9/2013 |
| CN | 203631172 U | 6/2014 |

(Continued)

OTHER PUBLICATIONS

Communication dated Feb. 23, 2017, from the State Intellectual Property Office of People's Republic of China in counterpart Application No. 201610187824.3.

*Primary Examiner* — Timothy Thompson
*Assistant Examiner* — Charles Pizzuto
(74) *Attorney, Agent, or Firm* — Sughrue Mion, PLLC

(57) ABSTRACT

A shielded electric wire includes an electric wire; a shielding member that forms a shielding layer by covering a periphery of the electric wire; a sheet-shaped member that covers a periphery of the shielding member; and a protective member spirally wound on a periphery of the sheet-shaped member. The sheet-shaped member includes a first sheet material and a second sheet material. One surface of the first and second sheet materials is formed with an adhesive layer. The first and second sheet materials have a width longer than a half circumferential distance of the shielding member provided on the periphery of the electric wire, and are stuck on the (Continued)

shielding member to sandwich the shielding member. The adhesive layers of the first and second sheet materials are opposingly stuck in extra length portions protruding the shielding member in a width direction.

7 Claims, 5 Drawing Sheets

(56) References Cited

U.S. PATENT DOCUMENTS

| | | | |
|---|---|---|---|
| 2011/0290556 A1* | 12/2011 | Okino | H01B 11/1025 174/74 R |
| 2013/0269970 A1* | 10/2013 | Hara | B60R 16/0215 174/101 |
| 2013/0269973 A1 | 10/2013 | Yukawa et al. | |
| 2014/0027150 A1 | 1/2014 | Gundel | |
| 2014/0102751 A1 | 4/2014 | Iwasaki et al. | |
| 2016/0247603 A1 | 8/2016 | Gundel | |

FOREIGN PATENT DOCUMENTS

| | | |
|---|---|---|
| JP | 2007-27050 A | 2/2007 |
| JP | 2011-222262 A | 11/2011 |
| JP | 2013-4354 A | 1/2013 |
| JP | 2015-130276 A | 7/2015 |

* cited by examiner

FIG. 5

| | TO SHEET-SHAPED MEMBER | | | TO PROTECTIVE MEMBER | | |
|---|---|---|---|---|---|---|
| | CROSS-SECTION STRUCTURE | AIRTIGHTNESS | WEAR RESISTANCE | CROSS-SECTION STRUCTURE | AIRTIGHTNESS | WEAR RESISTANCE |
| PRESENT EXAMPLE (EACH SHEET MATERIAL WITH THICKNESS OF 0.1 mm) |  | NOT GOOD 58.8kPa | NOT GOOD 10 |  | GOOD 200kPa OR MORE | GOOD 512 |
| COMPARATIVE EXAMPLE 1 (SHEET-SHAPED MEMBER WITH THICKNESS OF 0.1 mm) |  | NOT GOOD 58.8kPa | NOT GOOD 10 |  | GOOD 200kPa OR MORE | NOT GOOD 45 |
| COMPARATIVE EXAMPLE 2 (SHEET-SHAPED MEMBER WITH THICKNESS OF 0.3 mm) |  | TEST IMPOSSIBLE | GOOD 152 |  | NOT GOOD 78kPa | GOOD 1200 |

SHIELDED ELECTRIC WIRE AND WIRE HARNESS USING THE SAME

CROSS REFERENCE TO RELATED APPLICATION

This application is based on Japanese Patent Application (No. 2015-099685) filed on May 15, 2015, the contents of which are incorporated herein by reference. Also, all the references cited herein are incorporated as a whole.

BACKGROUND OF THE INVENTION

1. Technical Field

One or more embodiments of the present invention relate to a shielded electric wire and a wire harness using this shielded electric wire.

2. Background Art

A shielded electric wire including a shielding layer (electromagnetic shielding layer) on a periphery of an electric wire for, for example, transmitting a signal is used for wiring equipment which is susceptible to noise or tends to generate noise in electrical wiring of the inside of a vehicle.

Such a shielded electric wire is configured to include, for example, plural electric wires having at least one electric wire and a drain wire, a conductive sheet that covers these plural electric wires, and a protective tape (see below-described Patent Literature 1, for instance). The conductive sheet has a long band shape, and is wound on the electric wires in a state longitudinally attached to the electric wires, and edges of both sides along a longitudinal direction are overlapped mutually and vertically. Also, the protective tape is a long-shaped tape, and is spirally wound on an outer periphery of the conductive sheet.

Also, a known member having such a shielding function is a tape-shaped member spirally wound on an outer periphery of the electric wire in addition to the sheet-shaped member (see Patent Literatures 2, 3, for instance).

Patent Literature 1 is JP-A-2013-4354, Patent Literature 2 is JP-A-2007-27050, and Patent Literature 3 is JP-A-2011-222262.

SUMMARY OF THE INVENTION

Here, the applicant of this application found an invention of a shielded electric wire as described in Japanese Patent Application No. 2014-1341. In this shielded electric wire, in order to ensure airtightness (prevent water from entering), a sheet-shaped member (for example, an adhesive tape) is stuck on a shielding layer such as metal foil formed on the periphery of an electric wire in a longitudinally attached state and further, a protective member (for example, an adhesive tape) is spirally wound on its sheet-shaped member.

In the shielded electric wire according to the above, the sheet-shaped member is wound on the shielding layer so that an adhesive surface of the sheet-shaped member faces inwardly. In an extra length portion of the sheet-shaped member wound on the shielding layer, the mutual adhesive surfaces are opposingly attached.

Here, it is necessary to adopt, for example, a member having a certain thickness as the sheet-shaped member for providing airtightness in order to ensure wear resistance in the shielded electric wire described above. However, in the case that the thick sheet-shaped member is opposingly attached and stuck, its bending stress is high and the sheet-shaped member may be peeled from the root of the opposingly stuck portion. Then, when the sheet-shaped member is peeled, a target value of airtightness cannot be satisfied.

One or more embodiments of the invention have been implemented in order to address the above circumstances, and an object thereof is to provide a shielded electric wire and a wire harness capable of satisfying both target values of wear resistance and airtightness.

A shielded electric wire of the embodiments of the invention includes at least one electric wire, a shielding member that forms a shielding layer by covering a periphery of the electric wire, a sheet-shaped member that covers a periphery of the shielding member, and a protective member spirally wound on a periphery of the sheet-shaped member, wherein the sheet-shaped member includes a first sheet material and a second sheet material, and one surface of each of the first and second sheet materials is formed with an adhesive layer, each of the first and second sheet materials has a width longer than a half circumferential distance of the shielding member provided on the periphery of the electric wire, the first and second sheet materials are stuck on the shielding member with the shielding member sandwiched between the first and second sheet materials, and the adhesive layers of the first and second sheet materials are opposingly stuck in extra length portions respectively protruding on both sides of the shielding member in a width direction.

According to the shielded electric wire of the embodiments of the invention, the sheet-shaped member includes the first sheet material and the second sheet material, and has the width longer than the half circumferential distance of the shielding member formed on the periphery of the electric wire, the first and second sheet materials are stuck on the shielding member with the shielding member sandwiched between the first and second sheet materials, and the adhesive layers of the first and second sheet materials are opposingly stuck in extra length portions respectively protruding on both sides of the shielding member in a width direction. As a result, as compared with the case of opposingly sticking the extra length portions using one sheet material, by using the two sheet materials, a bending stress is low and the possibility of being peeled from a root of the opposingly stuck portion is decreased. Hence, even in the case of using the sheet materials having a certain thickness, the sheet materials become resistant to being peeled, and the shielded electric wire capable of satisfying both target values of wear resistance and airtightness can be provided.

Also, in the shielded electric wire of the embodiments of the invention, preferably, each of the stuck extra length portions is formed longer than the half circumferential distance of the shielding member, and is wound so that the stuck extra length portions cover a whole area of a trunk part that is other portions in the first and second sheet materials than the extra length portions.

According to this shielded electric wire, each of the stuck extra length portions is formed longer than the half circumferential distance of the shielding member, with the result that the extra length portions can be wound circumferentially so as to make one or more rounds and wear resistance can be improved more.

Also, in the shielded electric wire of the embodiments of the invention, preferably, the protective member is formed in a laminated state of two or more layers in a longitudinal direction of the electric wire by being spirally wound so as to lap on the periphery of the sheet-shaped member.

According to this shielded electric wire, the protective member is formed in the laminated state of two or more layers continuously in the longitudinal direction of the electric wire by being wound so as to lap, with the result that wear resistance can be improved more by the protective member of the two or more layers.

Also, in the shielded electric wire of the embodiments of the invention, preferably, the extra length portion of the first sheet material and the extra length portion of the second sheet material are opposingly stuck in a state shifted mutually, and one of the stuck extra length portions has a region in which the adhesive layer of the first sheet material does not make contact with the adhesive layer of the second sheet material, and the other of the stuck extra length portions has a region in which the adhesive layer of the second sheet material does not make contact with the adhesive layer of the first sheet material.

According to this shielded electric wire, the extra length portion of the first sheet material and the extra length portion of the second sheet material are stuck in the state shifted mutually. As a result, each of the stuck extra length portions can be circumferentially wound and bonded using the region which does not make contact with the adhesive layer of the one sheet material in the adhesive layer of the other sheet material. Accordingly, two adhesive areas are added, and the shielded electric wire with better waterproofness can be obtained.

Also, in the shielded electric wire of the embodiments of the invention, preferably, the electric wires include a twisted wire formed by intertwining plural sheathed electric wires including a conductor part and a sheath part, and a drain wire longitudinally attached to the twisted wire.

According to this shielded electric wire, the electric wires include the twisted wire formed by intertwining the plural sheathed electric wires, and the drain wire longitudinally attached to the twisted wire, with the result that both target values of wear resistance and airtightness can be satisfied in the shielded electric wire including the twisted wire and the drain wire.

Also, in the shielded electric wire of the embodiments of the invention, preferably, the drain wire is made of a sheathed electric wire including a conductor part and a sheath part, and the sheath part is peeled off in a part of connection to the shielding member.

According to this shielded electric wire, the sheath part of the drain wire is peeled off in the part of connection to the shielding member, with the result that a portion other than the connection part is sheathed, and it can become resistant to damaging the shielding member by the portion.

Also, a wire harness of the embodiments of the invention has the above shielded electric wire of one or more circuits.

The wire harness of the embodiments of the invention has the above shielded electric wire of one or more circuits, with the result that the wire harness having the shielded electric wire suitable for environment exposed to rainwater and vibrated, for example, an engine room of a vehicle can be provided.

The embodiments of the invention can provide the shielded electric wire and the wire harness capable of satisfying both target values of wear resistance and airtightness.

BRIEF DESCRIPTION OF THE DRAWINGS

FIG. 5 is a diagram showing airtightness and wear resistance of a shielded electric wire according to Present Example and shielded electric wires according to Comparative Examples.

DETAILED DESCRIPTION OF THE EXEMPLARY EMBODIMENTS

An embodiment of the invention will hereinafter be described based on the drawings, but the invention is not limited to the following embodiment, and can properly be changed without departing from the gist of the invention.

Figure 1:
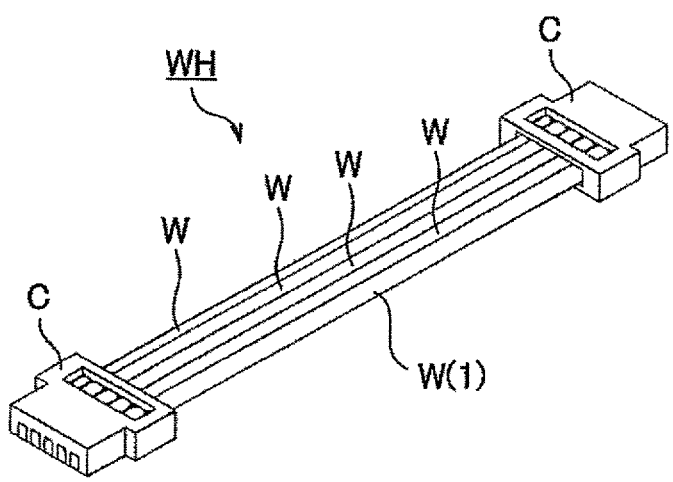
FIG. 1 is a wire harness including a shielded electric wire according to an embodiment of the invention.

FIG. 1 is a wire harness including a shielded electric wire according to the embodiment of the invention. As shown in FIG. 1, a wire harness WH is formed by bundling plural electric wires N, and at least one (one circuit) of the plural electric wires N is constructed of the following shielded electric wire 1 described in detail. Such a wire harness WH may include connectors C on both ends of the electric wires N as shown in, for example, FIG. 1, and may be wound by a tape (not shown) in order to gather the plural electric wires W. Also, the wire harness WH may include an exterior component (not shown) such as a corrugate tube.

Figure 2:
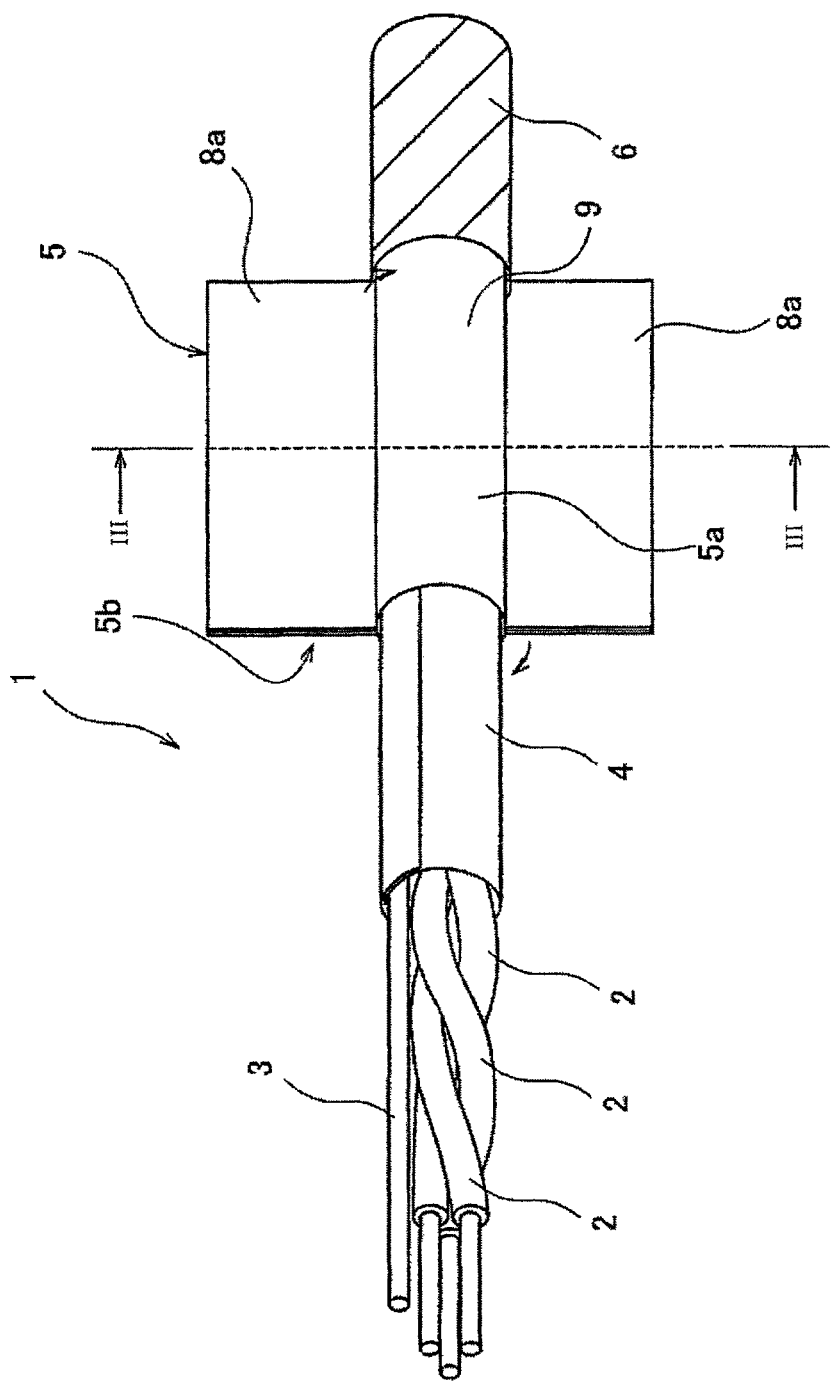
FIG. 2 is a perspective view showing the shielded electric wire shown in FIG. 1.

FIG. 2 is a perspective view showing the shielded electric wire 1 shown in FIG. 1. The shielded electric wire 1 according to the present embodiment includes plural (three in the embodiment) sheathed electric wires 2, a drain wire 3, a metal foil material (shielding member) 4, a sheet-shaped member 5, and a protective tape (protective member) 6.

The sheathed electric wire 2 is formed by covering the periphery of a core wire (conductor part) with an insulating sheath (sheath part), and is an electric wire without having a shielding layer. In the embodiment, the three sheathed electric wires 2 are intertwined at a predetermined intertwine pitch, and are gathered in one electric wire bundle to form a twisted wire.

The drain wire 3 is a bare electric wire with substantially the same cross-sectional area as that of the core wire of the sheathed electric wire 2, and the length of the drain wire 3 is set in substantially the same as that of the sheathed electric wire 2. The drain wire 3 is longitudinally attached to the intertwined wire made of the three sheathed electric wires 2.

Connecting terminals (not shown) are respectively connected to an end of each of the sheathed electric wire 2 and an end of the drain wire 3. The drain wire 3 is grounded and connected to a ground part of equipment etc. located in an end side of each of the sheathed electric wire 2.

In addition, the embodiment shows an example in which the drain wire 3 is the bare electric wire, but is not limited to this example, and the drain wire 3 may be constructed of a sheathed electric wire having a conductor part and a sheath part. Also, when the drain wire 3 is the sheathed electric wire, the sheath part of the drain wire 3 is peeled off in a part of connection to the metal foil material 4.

The metal foil material 4 forms a shielding layer by covering a periphery (periphery of the plural electric wires) of the three sheathed electric wires 2 and the drain wire 3. Such a metal foil material 4 is constructed by forming a metal foil layer (for example, an aluminum foil layer) on one surface of, for example, a polyethylene film which is an insulating material. The metal foil layer functions as the shielding layer. The metal foil material 4 is wound on the outer periphery of the sheathed electric wires 2 and the drain wire 3 with the metal foil layer facing inwardly. The metal foil layer makes contact with the drain wire 3 and thereby, the wound metal foil material 4 changes to a state of continuity with the drain wire 3. In addition, preferably, a gap between the metal foil material 4 and an electric wire bundle made of the three sheathed electric wires 2 and the drain wire 3 is filled with a conductive adhesive (not shown) to enhance stability of the state of continuity between the metal foil layer and the drain wire 3.

Figure 3:
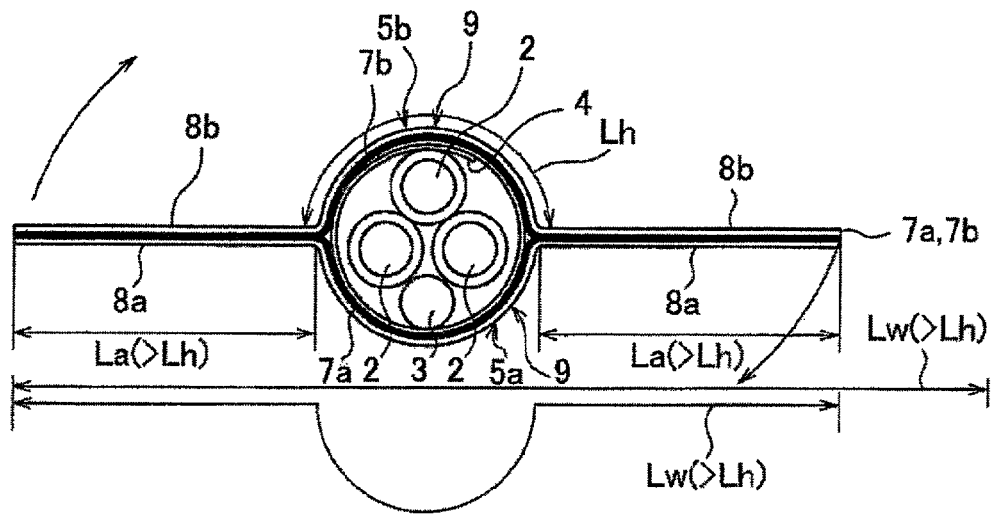
FIG. 3 is a sectional view taken on line of the shielded electric wire shown in FIG. 2.

The sheet-shaped member 5 covers the periphery of the metal foil material 4, and is formed from the standpoint of wear resistance and airtightness. FIG. 3 is a sectional view taken on line III-III of the shielded electric wire 1 shown in FIG. 2. The sheet-shaped member 5 includes two sheet materials 5a, 5b of a first sheet material 5a and a second sheet material 5b.

Each of the sheet materials 5a, 5b is an adhesive tape or an adhesive sheet in which an adhesive is applied to one surface of a polyethylene terephthalate film and adhesive layers 7a, 7b are formed, and has a predetermined thickness (between 0.01 mm and 0.19 mm).

Also, each of the sheet materials 5a, 5b has a width Lw longer than a half circumferential distance Lh of the metal foil material 4 formed on the periphery of the electric wires 2, 3, and is configured to be stuck on the metal foil material 4 from the side mutually opposed to the metal foil material 4. Namely, the sheet materials 5a, 5b are stuck on the metal foil material 4 with the metal foil material 4 sandwiched between the sheet materials 5a, 5b. And, in the respective sheet materials 5a, 5b, the adhesive layers 7a, 7b are opposingly stuck on the other adhesive layers 7b, 7a in extra length portions 8a, 8b respectively protruding in a width direction.

As shown in FIG. 2, the protective tape 6 is a long-shaped tape, and is spirally wound on the outer periphery of the sheet-shaped member 5. As the protective tape 6, for example, an adhesive tape with an adhesive layer formed on an inner surface of a tape material can be used. Also, the protective tape 6 is formed in a laminated state of two or more layers continuously in a longitudinal direction of the electric wire by being spirally wound so as to overlap itself, that is, lap on the periphery of the sheet-shaped member 5. For example, the protective tape 6 is formed in the laminated state of two layers by being wound so as to lap by half in a tape width direction, or in the laminated state of three layers by being wound so as to lap by two-thirds in the tape width direction.

Next, a method for manufacturing the shielded electric wire 1 according to the embodiment will be described. First, three sheathed electric wires 2 and one drain wire 3 are prepared. The three sheathed electric wires 2 are intertwined at a predetermined intertwine pitch and thereby, a twisted wire is formed and the drain wire 3 is longitudinally attached to the twisted wire.

Next, the metal foil material 4 is prepared, and the metal foil material 4 is wound on the outer periphery of the electric wires 2, 3 with the metal foil layer facing inwardly. This metal foil material 4 is wound so as to vertically overlap the mutual edges of both sides along the longitudinal direction.

Then, the sheet-shaped member 5 is mounted to the metal foil material 4. At this time, the first sheet material 5a and the second sheet material 5b are mounted from the mutually opposed sides. Since each of the sheet materials 5a, 5b has the width Lw longer than the half circumferential distance Lh of the metal foil material 4, the extra length portions 8a, 8b are respectively produced in both end sides. In these extra length portions 8a, 8b, the mutual adhesive layers 7a, 7b are opposingly stuck so as to adhere.

In this state, as shown in FIGS. 2 and 3, inner surfaces of the extra length portions 8a, 8b are mutually bonded and the extra length portions 8a, 8b become erected. Because of this, the erected portions are folded (folded in directions of arrows shown in FIGS. 2 and 3) along an electric wire trunk part (an outer surface of the sheet-shaped member 5) 9. Then, with the extra length portions 8a, 8b folded, the protective tape 6 is spirally wound. Accordingly, the shielded electric wire 1 shown in FIG. 4 is obtained.

Figure 4:
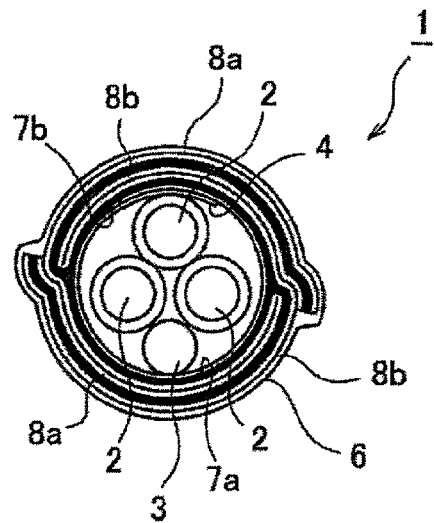
FIG. 4 is a sectional view of the shielded electric wire according to the present embodiment.

FIG. 4 is a sectional view of the shielded electric wire 1 according to the embodiment. As shown in FIG. 4, the extra length portions 8a, 8b are folded along the electric wire trunk part 9, and the electric wires 2, 3 and the metal foil material 4 of the inside become protected by the extra length portions 8a, 8b.

As is also apparent from FIG. 3 herein, preferably, a length La of each of the extra length portions 8a, 8b is formed longer than the half circumferential distance Lh of the metal foil material 4, and the extra length portions 8a, 8b are wound so as to cover the whole area of the trunk part 9 used as a region other than the extra length portions 8a, 8b in the sheet materials 5a, 5b. This is because the extra length portions 8a, 8b can be wound circumferentially so as to make one or more rounds using both of the extra length portions 8a, 8b and wear resistance can be improved more.

Next, airtightness and wear resistance of a shielded electric wire according to Present Example and shielded electric wires according to Comparative Examples will be described. FIG. 5 is a diagram showing airtightness and wear resistance of the shielded electric wire 1 according to Present Example and shielded electric wires according to Comparative Examples.

As shown in FIG. 5, in shielded electric wires according to Comparative Examples 1, 2, one sheet material is used as a sheet-shaped member, and the one sheet material is wound on a metal foil material so as to make one round and also, mutual adhesive layers of extra length portions are opposingly stuck so as to overlap. The shielded electric wires of Comparative Examples 1, 2 differ in thickness of the sheet material, and the thickness of the sheet material is 0.1 mm in Comparative Example 1, and the thickness of the sheet material is 0.3 mm in Comparative Example 2. On the other hand, sheet materials 5a, 5b with a thickness of 0.1 mm are used in Present Example.

Airtightness tests and wear resistance tests were conducted on products (that is, products without protective members) formed to sheet-shaped members and products (that is, finished products) formed to protective members in such shielded electric wires according to Present Example and Comparative Examples 1, 2.

The airtightness test was conducted by a method in which one end of the shielded electric wire was hermetically sealed and was immersed in a water tank filled with water and compressed air with 10 kPa (0.1 kgf/cm$^2$) was pumped from the other end. Specifically, the compressed air with 10 kPa was first pumped for 30 seconds, and in the case of no leak (that is, the case where bubbles were not blown out of one end side of the electric wire), compressed air with the pressure increased by 10 kPa was pumped. Then, as long as there was no leak, compressed airs with the pressures increased by 10 kPa were sequentially pumped, and a pressure of the compressed air at the time of an air leak was measured.

In addition, in FIG. 5, a target value of airtightness of 100 kPa or more is shown by "GOOD", and the target value of airtightness of less than 100 kPa is shown by "NOT GOOD".

The wear resistance test was conducted in conformity with a wear test described in ISO6722 5.12, and the number of reciprocations was measured until there was continuity between a needle and a metal foil material. As test conditions, a needle diameter is (0.45±0.01) mm, and a frequency is (55±5) reciprocation/min. A needle movement is (20±1) mm, and a wear length is (15.5±1) mm, and a vertical force is 7 N, and a mandrel diameter is φ5.

In addition, in FIG. 5, a target value of wear resistance of 100 or more is shown by "GOOD", and the target value of wear resistance of less than 100 is shown by "NOT GOOD".

In the shielded electric wire according to Present Example, airtightness was 58.8 kPa in a state of the product to the sheet-shaped member. Also, as a result of conducting the wear resistance test on the sheet-shaped member, there was continuity between the needle and the metal foil material at the time when the number of reciprocations was 10. However, in a state of the product to the protective member, airtightness was 200 kPa or more, and in wear resistance, the number of reciprocations was 512.

On the other hand, in the shielded electric wire according to Comparative Example 1, airtightness was 58.8 kPa in the state of the product to the sheet-shaped member. Also, as a result of conducting the wear resistance test on the sheet-shaped member, there was continuity between the needle and the metal foil material at the time when the number of reciprocations was 10. Further, in the state of the product to the protective member, airtightness was 200 kPa or more, and in wear resistance, the number of reciprocations was 45.

Also, in the shielded electric wire according to Comparative Example 2, the airtightness test could not be conducted in the state of the product to the sheet-shaped member. This is because the sheet-shaped member is too thick (0.3 mm) and the opposingly stuck portion is peeled. Also, as a result of conducting the wear resistance test on the sheet-shaped member, there was continuity between the needle and the metal foil material at the time when the number of reciprocations was 152. In the state of the product to the protective member, airtightness was 78 kPa, and in wear resistance, the number of reciprocations was 1200.

Thus, it was found that the shielded electric wire according to Present Example could achieve the airtightness target value and the wear resistance target value. On the other hand, the shielded electric wire according to Comparative Example 1 could not achieve the wear resistance target value. This is because in the shielded electric wire according to Present Example, the extra length portions are wound on the trunk part so as to make one round, but Comparative Example 1 does not have such a configuration. In addition, in the shielded electric wire according to Present Example, the extra length portions are wound so as to make one round, but instead of this, or additionally, when the protective tape is wound so as to have two or more layers, the airtightness target value and the wear resistance target value can be achieved similarly. Hence, as long as the protective tape is wound so as to lap by half or more, the airtightness target value and the wear resistance target value can be satisfied even when the extra length portions are not wound so as to make one round. Further, the shielded electric wire according to Comparative Example 2 could not achieve the airtightness target value. This is because in the shielded electric wire according to Comparative Example 2, the sheet-shaped member is thick and the opposingly stuck portion is peeled.

Thus, according to the shielded electric wire 1 according to the embodiment, the sheet-shaped member 5 includes the first sheet material 5a and the second sheet material 5b, and has the width Lw longer than the half circumferential distance Lh of the metal foil material 4 formed on the periphery of the electric wires 2, 3, and is stuck on the metal foil material 4 from the side mutually opposed to the metal foil material 4, and the mutual adhesive layers 7a, 7b are opposingly stuck in the extra length portions 8a, 8b respectively protruding in the width direction. As a result, as compared with the case of opposingly sticking the extra length portions 8a, 8b using one sheet material, by using the two sheet materials 5a, 5b, a bending stress is low and the possibility of being peeled from the root of the opposingly stuck portion is decreased. Hence, even in the case of using the sheet materials 5a, 5b having a certain thickness, the sheet materials 5a, 5b become resistant to being peeled, and the shielded electric wire 1 capable of satisfying both target values of wear resistance and airtightness can be provided.

Also, each of the extra length portions 8a, 8b is formed longer than the half circumferential distance Lh of the metal foil material 4, with the result that the extra length portions 8a, 8b can be wound circumferentially so as to make one or more rounds and wear resistance can be improved more.

Also, the protective tape 6 is formed in the laminated state of two or more layers continuously in the longitudinal direction of the electric wire by being wound so as to lap, with the result that wear resistance can be improved more by the protective tape 6 of the two or more layers.

Also, the electric wires 2, 3 have the twisted wire formed by intertwining the plural sheathed electric wires 2, and the drain wire 3 longitudinally attached to the twisted wire, with the result that both target values of wear resistance and airtightness can be satisfied in the shielded electric wire 1 including the twisted wire and the drain wire 3.

Also, the sheath part of the drain wire 3 is peeled off in the part of connection to the metal foil material 4, with the result that a portion other than the connection part is sheathed, and it can become resistant to damaging the metal foil material 4 by the portion.

Also, the wire harness WH according to the embodiment has the above shielded electric wire 1 of one or more circuits, with the result that the wire harness having the shielded electric wire suitable for environment vibrated and exposed to rainwater, for example, an engine room of a vehicle can be provided.

The embodiment of the invention has been described above based on the embodiment, but the invention is not limited to the embodiment described above, and may be changed without departing from the gist of the invention.

For example, the shielded electric wire 1 according to the embodiment is not limited to the above, and various changes can be made. For example, it is unnecessary for the electric wires 2, 3 of the inside to include the twisted wire, and the electric wires 2, 3 may be a single wire or be in a state in which the electric wires are not intertwined simply.

Figure 6:
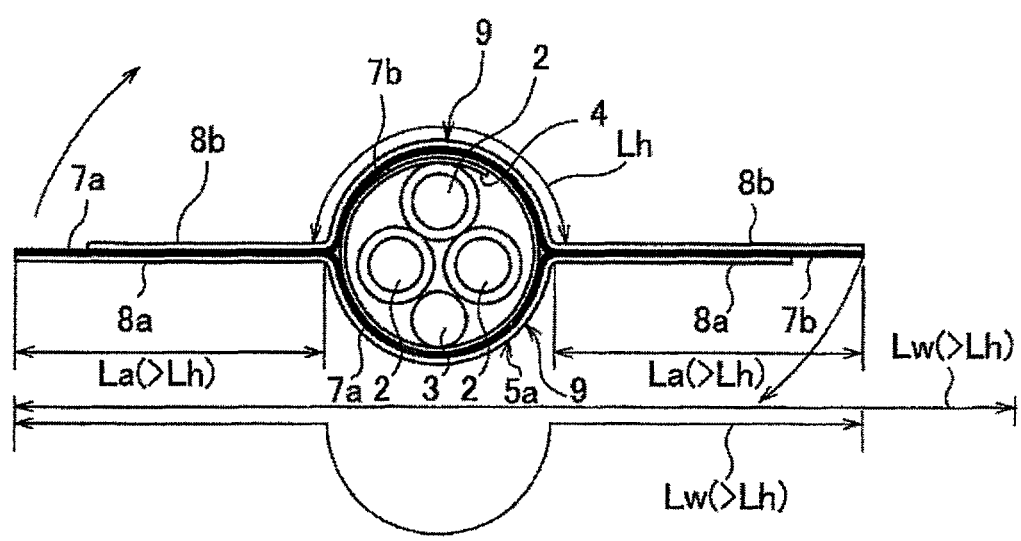
FIG. 6 is a sectional view showing a modified example of the shielded electric wire according to the embodiment.

Further, the shielded electric wire 1 according to the embodiment may be formed as shown in FIG. 6. FIG. 6 is a sectional view showing a modified example of the shielded electric wire 1 according to the embodiment. As shown in FIG. 6, an extra length portion 8a of a first sheet material 5a and an extra length portion 8b of a second sheet material 5b are opposingly stuck in a state shifted mutually. As a result, one of the extra length portions 8a, 8b has a region in which an adhesive layer 7a of the first sheet material 5a does not make contact with an adhesive layer 7b of the second sheet material 5b, and the other extra length portion 8a, 8b has a region in which the adhesive layer 7b of the second sheet material 5b does not make contact with the adhesive layer 7a of the first sheet material 5a. Hence, by winding the extra length portions 8a, 8b so that the non-contact regions (adhesive layers 7a, 7b) face inwardly, two adhesive areas are further added, and the shielded electric wire 1 with better waterproofness can be obtained.

Here, in the shielded electric wire 1 shown in FIG. 6, it goes without saying that each of the sheet materials 5a, 5b has a width Lw longer than a half circumferential distance Lh of a metal foil material 4. Also, in the shielded electric wire 1 shown in FIG. 6, a length La of each of the extra length portions 8a, 8b is preferably formed longer than the half circumferential distance Lh. This is because the extra length portions 8a, 8b can be wound circumferentially so as to make one or more rounds and wear resistance can be improved more.

What is claimed is:

1. A shielded electric wire comprising:
    at least one electric wire;
    a shielding member that forms a shielding layer by covering a periphery of the electric wire;
    a sheet-shaped member that covers a periphery of the shielding member; and
    a protective member spirally wound on a periphery of the sheet-shaped member, wherein
    the sheet-shaped member includes a first sheet material and a second sheet material, and
    one surface of each of the first and second sheet materials is formed with an adhesive layer,
    each of the first and second sheet materials has a width longer than a half circumferential distance of the shielding member provided on the periphery of the electric wire,
    the first and second sheet materials are stuck on the shielding member with the shielding member sandwiched between the first and second sheet materials, and
    the adhesive layers of the first and second sheet materials are opposingly stuck in extra length portions respectively protruding on both sides of the shielding member in a width direction.

2. The shielded electric wire according to claim 1, wherein each of the stuck extra length portions is formed longer than the half circumferential distance of the shielding member, and is wound so that the stuck extra length portions cover a whole area of a trunk part that is other portions in the first and second sheet materials than the extra length portions.

3. The shielded electric wire according to claim 1, wherein the protective member is formed in a laminated state of two or more layers in a longitudinal direction of the electric wire by being spirally wound so as to lap on the periphery of the sheet-shaped member.

4. The shielded electric wire according to claim 1, wherein
    the extra length portion of the first sheet material and the extra length portion of the second sheet material are opposingly stuck in a state shifted mutually, and
    one of the stuck extra length portions has a region in which the adhesive layer of the first sheet material does not make contact with the adhesive layer of the second sheet material, and
    the other of the stuck extra length portions has a region in which the adhesive layer of the second sheet material does not make contact with the adhesive layer of the first sheet material.

5. The shielded electric wire according to claim 1, wherein the electric wires include a twisted wire formed by intertwining plural sheathed electric wires including a conductor part and a sheath part, and a drain wire longitudinally attached to the twisted wire.

6. The shielded electric wire according to claim 5, wherein the drain wire is made of a sheathed electric wire including a conductor part and a sheath part, and the sheath part is peeled off in a part of connection to the shielding member.

7. A wire harness comprising the shielded electric wire according to claim 1 of one or more circuits.

* * * * *